US012702114B2

(12) United States Patent
Freeman et al.

(10) Patent No.: US 12,702,114 B2
(45) Date of Patent: Aug. 11, 2026

(54) SEPTUM FOR SIFTING AND FUNNELING WASTE IN A LITTER DEVICE

(71) Applicant: Automated Pet Care Products, LLC, Auburn Hills, MI (US)

(72) Inventors: Adam Freeman, Oakland Township, MI (US); Mason Newcombe, Grand Blanc, MI (US); Theresa Bonucci, Pontiac, MI (US)

(73) Assignee: AUTOMATED PET CARE PRODUCTS, LLC, Auburn Hills, MI (US)

( * ) Notice: Subject to any disclaimer, the term of this patent is extended or adjusted under 35 U.S.C. 154(b) by 0 days.

(21) Appl. No.: 18/861,310

(22) PCT Filed: Apr. 28, 2023

(86) PCT No.: PCT/US2023/066353
§ 371 (c)(1),
(2) Date: Oct. 29, 2024

(87) PCT Pub. No.: WO2023/212686
PCT Pub. Date: Nov. 2, 2023

(65) Prior Publication Data

US 2025/0280785 A1 Sep. 11, 2025

Related U.S. Application Data

(60) Provisional application No. 63/336,618, filed on Apr. 29, 2022.

(51) Int. Cl.
*A01K 1/01* (2006.01)

(52) U.S. Cl.
CPC .................................. *A01K 1/0114* (2013.01)

(58) Field of Classification Search
CPC .............................. A01K 1/011; A01K 1/0114
See application file for complete search history.

(56) References Cited

U.S. PATENT DOCUMENTS 4,061,111 A * 12/1977 Smith .................. A01K 13/001 119/672
4,120,264 A * 10/1978 Carter .................. A01K 1/0114 119/166

(Continued)

FOREIGN PATENT DOCUMENTS

CN 109156367 A 1/2019
WO 2020/219849 A1 10/2020

(Continued)

OTHER PUBLICATIONS

International Search Report and Written Opinion, Application No. PCT/US2023/066353, mailed Jul. 25, 2023.

(Continued)

*Primary Examiner* — Christopher D Hutchens
*Assistant Examiner* — Nevena Aleksic
(74) *Attorney, Agent, or Firm* — The Dobrusin Law Firm, P.C.; Daniela M. Thompson-Walters

(57) ABSTRACT

A septum 1 for sifting and funneling waste material comprising: a) a funnel portion 10 having a tapered shape and funnel opening 24, wherein the tapered shape is configured to guide or funnel the waste material toward the funnel opening; b) a sifting portion 12 connected to the funnel portion 10, wherein the sifting portion includes: i) a lead section 16; ii) a sieve section 18 having a plurality of sieve openings 34; and iii) a guide section 20.

25 Claims, 8 Drawing Sheets

(56) References Cited

U.S. PATENT DOCUMENTS 5,544,620 A * 8/1996 Sarkissian ............ A01K 1/0114 119/166
6,401,661 B1 * 6/2002 Emery ................ A01K 1/0114 119/166
6,463,881 B2 * 10/2002 Reitz .................... A01K 1/0114 119/170
6,568,348 B1 * 5/2003 Bedard ................ A01K 1/0114 119/166
6,763,782 B1 * 7/2004 Kordelin .............. A01K 1/0114 119/451
7,263,951 B2 * 9/2007 Gillis ................... A01K 1/0114 119/165
8,757,094 B2 * 6/2014 Baxter ................... A01K 1/011 119/168
9,179,643 B2 * 11/2015 Loveday ................ A01K 1/011
9,433,185 B2 9/2016 Baxter
2012/0318203 A1 12/2012 Andrade
2013/0333625 A1 12/2013 Baxter
2019/0364840 A1 12/2019 Baxter
2022/0125006 A1 4/2022 Smith et al.
2023/0380378 A1 11/2023 Smith et al.
2024/0196856 A1 6/2024 Smith et al.

FOREIGN PATENT DOCUMENTS

WO 2021/114579 A1 6/2021
WO 2022/087530 A1 4/2022
WO 2022/087531 A2 4/2022

OTHER PUBLICATIONS

PCT International Preliminary Report on Patentability mailed May 3, 2024, Application No. PCT/US2023/066353.

* cited by examiner

SEPTUM FOR SIFTING AND FUNNELING WASTE IN A LITTER DEVICE

FIELD

The present disclosure relates to a septum, litter device, and method of sifting and funneling waste. The septum may find use in sifting through litter, separating waste from clean litter, funneling waste toward a waste opening, and/or reducing the amount of dust and debris created during a cleaning cycle of a litter device. The septum may be particularly useful in a litter device which rotates during a cleaning cycle.

BACKGROUND

Automated litter devices may provide a means for pet owners (e.g., user) to effectively manage waste eliminated by one or more of their pets. These automated litter devices may be advantageous in automatically removing waste contents from litter; automatically collecting waste for subsequent disposal; storing waste contents separate from a litter chamber such that they are not exposed to the ambient environment, thereby preventing and/or reducing smell from the waste. Examples of some automated litter boxes which may be particularly beneficial may be found in U.S. Pat. Nos. 6,463,881; 8,757,094; and 9,433,185; US Publication No: 2019/0364840; PCT Patent Application No.: PCT/US2020/029776 (published as PCT Publication No. WO 2020/219849A1); and U.S. Provisional Application Nos. 63/104,574, 63/104,604, and 63/104,625 which are incorporated by reference herein in their entirety for all purposes and can be modified to include any of the features described herein.

A challenge with litter boxes with components which sift through litter is that the sifting motion creates dust and debris. For example, as a sifting screen sifts through the litter, the litter is disturbed, thus creating dust and debris, some of which become airborne and exit the chamber via an entry opening. The dust and debris may include fine particulates of the litter, animal waste (i.e., urine and feces), dander, and the like. The dust and debris may contribute to aggravating individuals' allergies and causing malodor. In addition, once outside of the chamber, the dust and debris may coat other living surfaces, requiring to be cleaned. Some of the airborne dust and debris may be a result of when the litter passes through a sifting screen. In a rotating chamber, this passing through may occur when a chamber rotates in a first direction and in an opposing second direction. During rotation in a first direction, used litter may pass through the sifting screen to separate waste from the used litter to segregate clean and/or unused litter. During rotation in a second direction, clean litter may pass both through the sifting screen and between the sifting screen and an interior surface of the chamber. As the litter is sifted by passing through openings of the sifting screen, the sifting action may result in the most dust and debris becoming airborne. While sifting cannot be avoided to separate waste from the litter, such as when a chamber rotates in a first direction, there is a need to reduce the amount of clean litter which passes through the screen after being sifted through, such as when the chamber rotates in a second direction.

SUMMARY

The present disclosure relates to a septum for sifting and funneling waste material comprising: a) a funnel portion having a tapered shape and funnel opening, wherein the tapered shape is configured to guide or funnel the waste material toward the funnel opening; b) a sifting portion connected to the funnel portion, wherein the sifting portion includes: i) a lead section; ii) a sieve section having a plurality of sieve openings; and iii) a guide section.

The present disclosure relates to a septum for sifting and funneling waste material from a litter comprising: a) a funnel portion having a tapered shape and funnel opening, wherein the tapered shape is configured to guide or funnel the waste material toward the funnel opening; b) a sifting portion connected to the funnel portion, wherein the sifting portion includes: i) a lead section configured to first contact the litter and the waste material; ii) a sieve section having a plurality of sieve openings configured to separate the waste material from the litter; and iii) a guide section configured to allow the waste material to transition from the sieve section to the funnel portion.

The septum of the present teachings may include one or more of the following features in any combination: the sieve section may be about 10% to about 75% of a surface area of the sifting portion; the sieve section may be about 20% to about 50% of the surface area of the sifting portion; the sieve section may be about 30% to about 40% of the surface area of the sifting portion; the plurality of sieve openings may have a cross-sectional shape which is substantially shaped like a diamond, circle, hexagon, square, rectangle, oval, ellipse, triangle, the like, or any combination thereof; the plurality of sieve openings may have a diamond-shaped cross-section; the plurality of sieve openings may each be tapered such that one outer surface has a larger cross-sectional area than at an opposing outer surface or are chamfered from both outer surfaces; the lead section may include a leading edge; the lead section may be adjacent to the sieve section; the leading edge may define an outer periphery of at least the lead section; the lead section may be about 10% to about 70% of the surface area of the sifting portion; wherein the lead section may be about 20% to about 50% of the surface area of the sifting portion; the lead section may be about 30% to about 40% of the surface area of the sifting portion; the plurality of sieve openings may be configured to allow litter to pass therethrough while preventing the waste material from passing therethrough; the lead section and the guide section may each be a substantially solid surface; the sifting portion may be affixed to or integral with the funnel portion; the sifting portion may be affixed to or integral with (e.g., one-piece) the funnel portion via one or more hinges; the one or more hinges may be one or more living hinges; the septum may be affixed into an interior of a chamber of a litter device; the sifting portion may be angled relative to the funnel portion at the one or more hinges; the septum may have an overall contour similar to the interior of the chamber; the septum may include a slit configured to impart additional flexibility; the slit may be part of the guide section; the slit may extend from a rear portion partially toward a front of the guide section; the lead section may include one or more spacers; the one or more spacers may be formed at or adjacent to a leading edge; the one or more spacers may be formed as one or more ribs, posts, tabs, fins, corrugations, the like, or any combination thereof; the one or more spacers may project from an outward facing surface of a lead section in a substantially same direction as a funnel neck of a funnel of the funnel portion in a mold position, an in-use position, or both of the septum; the one or more spacers may project from an outward facing surface of a lead section toward an interior wall of a chamber, away from a litter bed, or both when the septum is installed in a litter device; the septum may include a ramp between the funnel opening and the guide section; the ramp may be configured to change the speed of the waste material as it transitions from the sifting portion to the funnel portion; the ramp may be formed as part of the funnel portion; the ramp may be a convex contour; the ramp may be located between a hinge of the septum and the funnel opening.

The present disclosure may relate to a litter device comprising: a) a chamber configured to retain a litter and allow an animal to enter therein to eliminate a waste; b) a base which supports the chamber; c) a septum for sifting and funneling a waste material from the litter comprising: i) a funnel portion having a tapered shape and funnel opening, wherein the tapered shape is configured to guide or funnel the waste material toward the funnel opening; ii) a sifting portion connected to the funnel portion, wherein the sifting portion includes: a lead section configured to first contact the litter and the waste material; a sieve section having a plurality of openings configured to separate the waste material from the litter; and a guide section configured to allow the waste material to transition from the sieve section to the funnel portion.

The litter device of the present teachings may include one or more of the following features in any combination: a septum according to the teachings herein; the chamber may be configured to rotate in a first direction, a second direction, or both during a cleaning cycle of the litter device; a drive mechanism may be configured to rotate the chamber; a drive mechanism may drive the chamber at a steady speed, an increasing speed, a decreasing speed, or any combination thereof during a cleaning cycle; the chamber may be configured to slow down in rotational speed when the litter is passing through the septum such as to reduce dust and debris from the litter and the waste material; the chamber may have its speed reduced by about 5% to about 50%; the chamber may be rotated at a speed of about 0.25 RPM or greater to about 2 RPM or less.

The present disclosure may relate to a method of sifting and funneling a waste material from a litter comprising: a) initializing a cleaning cycle of a litter device by rotating a chamber of the litter device in a first direction; b) during rotation in the first direction, a lead section of a sifting portion of a septum within the chamber coming into contact with the litter and entering into the litter without allowing the litter to pass therethrough; c) during continued rotation in the first direction, a sieve section of the sifting portion which is adjacent to the lead section and having a plurality of sieve openings coming into contact with and sifting through the litter to separate the waste material from the litter; d) during continued rotation in the first direction, the waste material transitioning from the sifting portion of the septum to a funnel portion of the septum, the funnel portion including a funnel opening through which the waste material exits.

The method of the presenting teachings may include one or more of the following features or steps in any combination: during rotation in the first direction, the litter which passes through the plurality of sieve openings may be defined as an unused and clean litter; while the chamber continues to rotate in the first direction, the unused and clean litter may be located in a temporary storage area between the sifting portion and an interior wall of the chamber; after the waste material exits the funnel opening, the chamber may rotate in a second direction; when the chamber rotates in the second direction, all or a majority of the litter may pass under a gap which may be formed between a leading edge of the lead section and an interior surface of the chamber; the gap may be formed by one or more spacers of the septum; the septum is may be the septum according to the teachings herein; the litter device may be the litter device according to the teachings herein.

The present disclosure relates to a litter device comprising: a) a chamber configured to retain a litter and allow an animal to enter therein to eliminate a waste; b) a base which supports the chamber; c) a septum for sifting and funneling a waste material from the litter comprising: i) a funnel portion having a tapered shape and funnel opening, wherein the tapered shape is configured to guide or funnel the waste material toward the funnel opening; ii) a sifting portion connected to the funnel portion, wherein the sifting portion includes: a lead section configured to first contact the litter and the waste material; a sieve section having a plurality of openings configured to separate the waste material from the litter; and a guide section configured to allow the waste material to transition from the sieve section to the funnel portion.

The septum of the present teachings may aid in reducing airborne dust and debris during a cleaning cycle by guiding clean litter under a sifting portion when returning back to the bottom of a chamber. The clean litter may be routed under the sifting portion via a lead section. A lead section may provide a solid surface adjacent to a sieve section, between a sieve section and an inner surface of the chamber, or both. The lead section may then divert clean litter toward the inner surface of the chamber and under the sifting portion. One or more slits may impart flexibility on a sifting portion of the septum. Flexibility may allow for a greater amount of litter to pass through a gap between the sifting portion and an inner surface of the chamber. The sifting portion may flex when the force of the clean litter is applied onto its surface during the cleaning cycle. One or more spacers may aid in creating and/or maintaining a gap between an inner surface of the chamber and the sifting portion, preventing full contact between a leading edge of the sifting portion and the inner wall of the chamber, or both. By maintaining the gap and/or precenting full contact, more litter is able to pass through under the sifting portion during a cleaning cycle, thus reducing airborne dust and debris.

DETAILED DESCRIPTION

Figure 1:
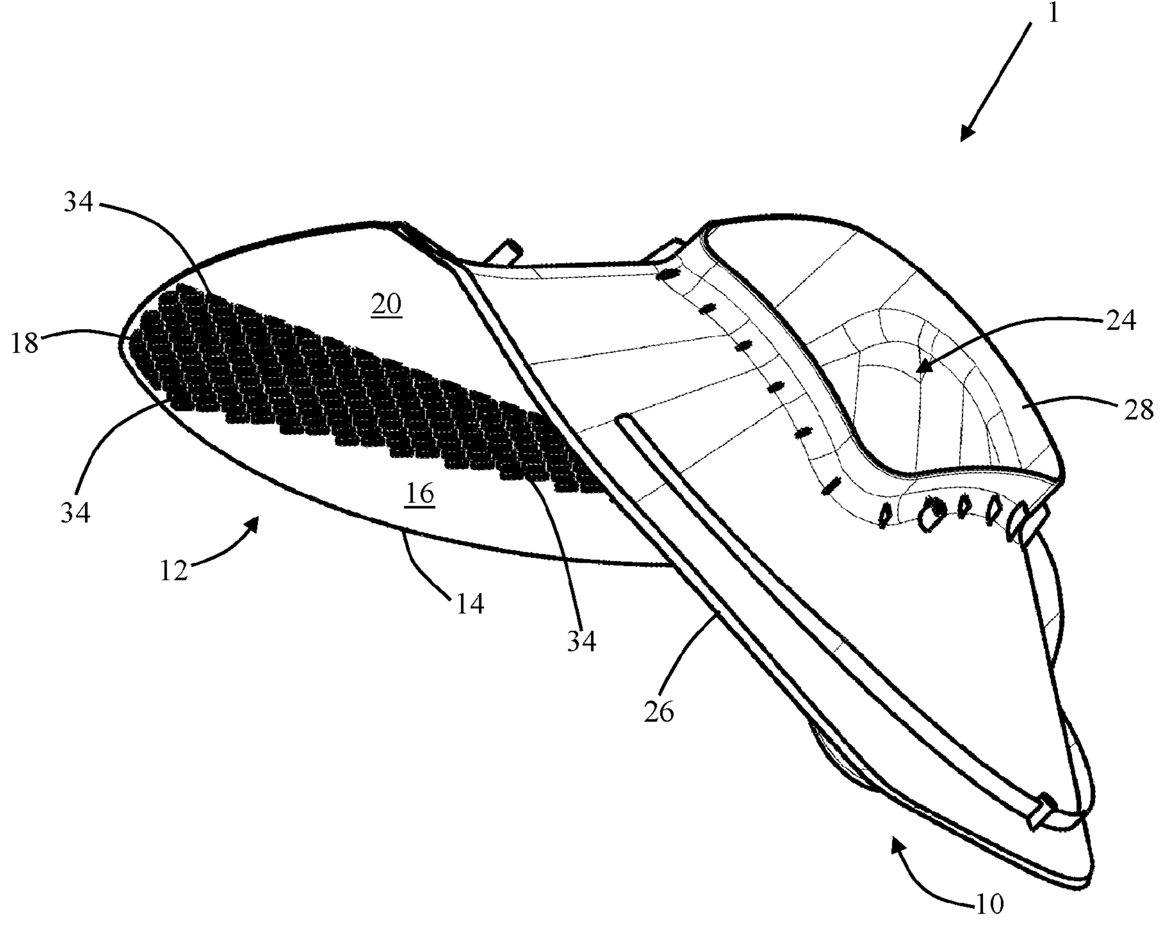
FIG. 1 is a perspective view of a septum.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Septum

The present disclosure relates to a septum. A septum may function to sort waste from litter, separate used litter from unused litter, guide waste outside of a chamber, cooperate with one or more other components of a litter device to provide for a temporary litter storage area, or any combination thereof. The septum may have any size and/or shape suitable for being located within the chamber to sift through litter during a cleaning cycle. The septum may rotate with a chamber of a litter device during a cleaning cycle (e.g., remain static relative to the chamber), may rotate within a chamber during a cleaning cycle (e.g., move relative to the chamber), or both. The septum may be a single piece or a plurality of pieces. The septum may include one or more portions, openings, spacers, hinges, covers, the like, or any combination thereof. The septum may be located within a chamber of a litter device, affixed to an interior of a chamber, integral with the chamber, or any combination thereof. The septum may be located opposite a litter bed when a chamber is in a home or resting position. The septum may be located opposite a liner of a chamber, opposite a lower chamber, or both. The septum may be at least partially aligned with a waste opening, partially through a waste opening, or both. The septum may be affixed to an and/or part of an upper chamber.

The septum may include a sifting portion. The sifting portion may function to sift through a litter bed, separate waste from litter, provide a temporary storage area for clean and/or unused litter, or any combination thereof. The sifting portion may be movably affixed to an interior of the litter device, moveable relative to a funnel portion, or both. The sifting portion may be free of direct attachment to the chamber. The sifting portion may be affixed to the chamber via a funnel portion, hinge, or both. The sifting portion may move (e.g., swing) and/or remain substantially static relative to the hinge, funnel portion, chamber, or combination thereof during a cleaning cycle, rotation of the chamber, or both. The sifting portion may be relatively planar, non-planar, or both. The sifting portion may have a cross-sectional shape reciprocal with at least a portion of an interior of the chamber. The sifting portion may have a shape which is generally D-shaped, C-shaped, square, rectangular, circular, the like, or any combination thereof. For example, the sifting portion may have a cross-section which is generally D-shaped to be reciprocal with a portion of a cross-section of a generally spherical chamber. The sifting portion may have an overall length about equal to or smaller than an interior diameter and/or interior chord length of the chamber. The sifting portion may be free of or come into physical contact with an interior of the chamber. The sifting portion may include a leading edge, one or more spacers, a lead section, a sieve section, and/or a guide section.

The sifting portion may include a lead section. A lead section may function to be the first section of the sifting portion which enters into a litter bed, retains one or more spacers, guides clean litter toward a gap when passing back into a main chamber area to form a litter bed, or any combination thereof. The lead section may be configured to first contact the litter and the waste material. The lead section may include a leading edge. The leading edge may be the outermost edge of the sifting portion, opposite a hinge, or both. The leading edge may define a portion of an outer periphery of at least the lead section. The leading edge may have the first surface which comes into contact with litter during a cleaning cycle. The leading edge may include or be free of a rim. A rim may have a different thickness (e.g., greater) than the rest of the surface of the sifting portion. The lead section may have a shape which comprises a portion of the overall shape of the sifting portion. The lead section may have a shape which is substantially D-shaped, C-shaped, oval shaped, rectangular shaped, triangle shaped, or a combination thereof. The lead section may be substantially planar, non-planar, or both. The lead section may be solid (e.g., free of openings), mostly solid, or both. For example, the lead section may include one opening in the form of a slit. The lead section may be about 10% or greater to about 20% or greater, to about 30% or greater, to even about 33% or greater of the surface area of the sifting portion. The lead section may be about 90% or less, about 80% or less, about 70% or less, about 60% or less, or even about 50% or less of the surface area of the sifting portion. For example, a lead section may be about 10% to about 75%, 20% to about 50%, about 30% to about 40%, or even about 30% to 35% of the surface area of the sifting portion. The lead section may have a surface area less than, about equal to, or even greater than a surface area of a guide section and/or sieve section. The lead section may include one or more spacers.

The septum may include one or more spacers. One or more spacers may function to create and/or maintain a gap between one or more edges of the septum and an interior surface of the chamber, prevent a leading edge from making full contact with an interior of a chamber, provide structural support to the sifting portion, or any combination thereof. The one or more spacers may be located along one or more edges. The one or more spacers may be located at or along a leading edge. The one or more spacers may include a single spacer or a plurality of spacers. The one or more spacers may include 1 or more, 2 or more, or even 3 or more spacers. The one or more spacers may include 20 or less, 15 or less, or even 10 or less spacers. A plurality of spacers may be uniformly or unevenly spaced along a leading edge. For example, 3 to 5 spacers may be generally uniformly spaced along the leading edge. One or more spacers may be in the form of one or more protrusions. The one or more protrusions may project in the same direction as a funnel. The one or more protrusions may project from the leading edge, from an outward facing surface of the sifting portion, toward a wall of a chamber, away from a litter bed, or any combination thereof. The one or more spacers may be formed as one or more ribs, posts, gussets, corrugations, the like, or any combination thereof. The one or more spacers may be affixed to and/or integral with the sifting portion. The one or more spacers may be integrally formed with the surface of the leading edge, lead section, or both. The one or more spacers may be advantageous in allowing litter to flow from a temporary storage area into a bottom of a chamber more quickly, creating a gap for litter to flow through, reducing the amount of clean litter flowing back through a sieve section, or any combination thereof. Any or all of these advantages may provide for reduction in dust and debris being created during the cleaning cycle.

The one or more spacers may create a gap with an interior surface of a chamber. A gap may allow for litter to flow therethrough during a cleaning cycle. The gap may be between the sifting portion and the interior surface of the chamber. The gap may be between the lead section and the interior surface of the chamber. The gap may be between the leading edge and the interior surface of the chamber. The gap may be large enough to allow clean and/or unused litter to pass therethrough while small enough to prevent waste within the litter to pass through. The gap may allow unused and/or clean litter to pass through at any stage during a cleaning cycle. The gap may allow for unused and/or clean litter to pass through during rotation of the chamber into an emptying position and/or returning back to a home position. The gap may be particularly beneficial in reducing the amount of dust and debris created during the cleaning cycle. Even more specifically, the gap may reduce the dust and debris created when the chamber is returning from a waste emptying position to a home position. By allowing the unused and/or clean litter to flow through, as opposed to the litter coming into contact with the sifting portion and all flowing through the sieve section, the mass of litter is less disturbed during the cleaning cycle, thus reducing the amount of dust and debris generated.

The sifting portion may include a sieve section. The sieve section may function to sift through used litter, separate waste from used litter to provide for clean and/or unused litter, or both. The sieve section may be configured to separate a waste material from a litter. The sieve section may have a shape which comprises a portion of the overall shape of the sifting portion. The sieve section may have a shape which is substantially triangular, rectangular, square, ovular, circular, D-shaped, C-shaped, the like, or any combination thereof. The sieve section may extend across all, mostly all, or only a portion of a depth (i.e., front to rear) of a sifting portion. The sieve section may be substantially planar, non-planar, or both. The sieve section may be adjacent to a lead section, a guide section, or both. The sieve section may be located between a lead section and a guide section. The sieve section may be ribbed, grated, corrugated, slotted, meshed, the like, or any combination thereof. The sieve section may include one or more sieve openings. The sieve openings may have any size and/or shape which allows for litter to pass through while preventing waste material from passing therethrough. The area of a sifting portion with the sieve openings may be referred to as the sieve section. The sieve section may be about 10% or greater to about 20% or greater, to about 30% or greater, to even about 33% or greater of the surface area of the sifting portion. The sieve section may be about 90% or less, about 80% or less, about 70% or less, about 60% or less, or even about 50% or less of the surface area of the sifting portion. For example, a sieve section may be about 10% to about 75%, 20% to about 50%, about 30% to about 40%, or even about 30% to 35% of the surface area of the sifting portion. The sieve section only being a portion of the surface area of the sifting portion may be advantageous in allowing used litter to be sifted through to segregate clean litter from waste material at a desired speed of rotation of the chamber during a cleaning cycle. The sieve section only being a portion of the surface area may also be advantageous in cooperating with a lead section to promote a majority or even all of the clean litter passing through the gap (i.e., between the lead edge and the interior of the chamber) from a temporary storage area back to the resting position to form a litter bed.

The sieve section may include a plurality of sieve openings. The plurality of sieve openings may be sized and/or shaped such as to allow for unused (e.g., clean) litter to pass therethrough while waste (e.g., used litter, clumps, lumps, and/or the like) are prevented from passing through. The plurality of sieve openings in the sifting portion may allow for litter to be sifted through during a cleaning cycle to separate waste from the unused litter. The plurality of sieve openings may have a cross-sectional shape which is similar to or substantially shaped like a diamond, circle, hexagon, square, rectangle, oval, ellipse, triangle, the like, or any combination thereof. For example, the plurality of sieve openings may have a diamond-shaped cross-section. The cross-section may be taken parallel to the majority of a surface of the sifting portion. The interior peripheral surface may be shaped to guide litter therethrough, facilitate the molding process, or both. The interior peripheral surface of the sieve openings may be tapered, chamfered, beveled, planar, the like, or any combination thereof. The interior peripheral surface may be a surface of the sieve opening extending from and/or connecting one surface of the sifting portion (e.g., facing toward a litter bed, litter liner) to an opposing surface of the sifting portion (e.g., facing away from a litter bed, litter liner; facing toward an interior of a chamber). The plurality of sieve openings may have a cross-sectional area greater than the typical diameter, width, and/or length of a granule, pellet, and/or bead of litter such that the litter may pass through. The plurality of openings may have a cross-sectional area smaller than a typical clump of waste such that litter may be prevented from passing therethrough. The plurality of sieve openings may each have a cross-sectional area of about 0.01 square inches (0.064 square cm) or greater, about 0.03 square inches (0.194 square cm) or greater, or even about 0.05 square inches (0.323 square cm) or greater. The plurality of sieve openings may each have a cross-sectional area of about 0.1 square inches (0.645 square cm) or less, about 0.08 square inches (0.516 square cm) or less, or even about 0.06 square inches (0.387 square cm) or less. The sieve section may include sufficient openings to allow litter to pass through during a cleaning cycle without backing up. The plurality of openings may include 50 or more, 75 or more, 100 or more, 125 or more, or even 150 or more openings. The plurality of openings may include 400 or less, 300 or less, 275 or less, 250 or less, or even 220 or less openings. For example, the plurality of openings may include about 150 to about 250 openings. After litter has passed through the sieve openings, separated waste may be funneled toward a guide section.

The sifting portion may include a guide section. A guide section may function to guide waste toward a funnel portion, connect a sifting portion to a hinge and/or funnel portion, cooperate with an interior surface of a chamber to provide a temporary storage area for clean litter, or a combination thereof. A guide section may be configured to allow the waste material to transition from the sieve section to the funnel portion. The guide section may be located adjacent to a sieve section, hinge, funnel portion, or any combination thereof. The guide section may be integral and/or affixed to a hinge, a funnel portion, or both. The guide section may include or be free of a slit formed therein or adjacent thereto. The guide section may include a slit. The slit may be formed at a rear side of the septum and extending partially toward the front. The guide section may be substantially planar, non-planar, or both. The guide section may be solid (e.g., free of openings), mostly solid, or both. For example, the guide section may include one opening in the form of a slit. The guide section may be about 10% or greater to about 20% or greater, to about 30% or greater, to even about 33% or greater of the surface area of the sifting portion. The guide section may be about 90% or less, about 80% or less, about 70% or less, about 60% or less, or even about 50% or less of the surface area of the sifting portion. For example, a guide section may be about 10% to about 75%, 20% to about 50%, about 30% to about 40%, or even about 30% to 35% of the surface area of the sifting portion. The guide section may have a surface area less than, about equal to, or even greater than a surface area of a lead section and/or sieve section. The guide section may comprise a portion of the overall shape of the sifting portion. The guide section may have a shape which resembles a triangle, rectangle, trapezoid, oval, the like, or a combination thereof.

The septum may include one or more hinges. A hinge may function to connect a funnel portion to a sifting portion. A hinge may impart flexibility of the sifting portion relative to the funnel portion. A hinge may function to allow a funnel portion, sifting portion, or both to move relative to the other, relative to an interior of chamber, or both during one or more cleaning cycles and/or rotation of the chamber. A hinge may be affixed to, integral with, adjacent to, located between, or a combination thereof to the funnel portion and the sifting portion. A hinge may be affixed to, integral with, adjacent to, located between, or a combination thereof to the funnel portion and a guide section. A hinge may be a multi-component hinge (e.g., butt hinge) or a single component hinge. A single component hinge may be a living hinge. The hinge may be made of any material which allows movement of the funnel portion, sifting portion, or both relative to the other, the chamber interior, or both. Movement may mean movement of the funnel portion, sifting portion, or both relative to the other during the forming process of the septum, before and/or during installation of the septum into the chamber, rotation of the chamber during a cleaning cycle, or any combination thereof. A hinge may be formed such that it allows the sifting portion geometry to be formed in the line of draw of the septum for molding. A hinge may allow for the sifting portion to be angled relative to the funnel portion. A hinge may allow the sifting portion to be angled toward the funnel portion when installed within a chamber. The angle may be the angle between the sifting portion and the funnel portion at a bottom of the septum, the angle facing toward a litter bed, or both. A hinge may be made of the same material as the sifting portion, funnel portion, or both. A hinge may allow for the septum to be installed and contour to a shape substantially reciprocal to an interior of the chamber.

The sifting portion, in a home position of the chamber, natural resting position of the septum outside of the chamber, or both may be at an acute, perpendicular, or obtuse angle relative to the funnel portion. The sifting portion may be at an angle relative to the funnel portion of about 90 degrees or greater, about 120 degrees or greater, about 140 degrees or greater, or even about 150 degrees or greater. The sifting portion may be at an angle relative to the funnel portion of about 180 degrees or less, about 170 degrees or less, or even about 160 degrees or less. The angle may be measured as the angle between the surfaces facing toward the litter bed, lower chamber, base, interior of the chamber, or any combination thereof. The angle may change when the septum is located within a chamber. The angle between the sifting portion and the funnel portion may be reduced when the septum transitions between a natural resting position (i.e., mold position) and an in-use position (i.e., design position) within a chamber. The angle between the sifting portion and the funnel portion may be reduced by about 10 degrees or greater, about 20 degrees or greater, about 30 degrees or greater, or even about 40 degrees or greater. The angle between the sifting portion and the funnel portion may be reduced by about 80 degrees or less, about 70 degrees or less, about 60 degrees or less, or even about 50 degrees or less. For example, the angle between the sifting portion and the funnel portion may be reduced by about 20 degrees to about 70 degrees, about 30 degrees to about 60 degrees, about 40 degrees to about 50 degrees, or even about 40 degrees to about 45 degrees.

As an alternative, the septum may be free of a hinge. The funnel portion may be statically affixed to the sifting portion, directly adjacent to the sifting portion, and/or integral with the sifting portion. The funnel portion and the sifting portion may be integral with one another and static relative to one another. The funnel portion and the sifting portion may be separate pieces. The funnel portion may be affixed to the sifting portion with one or more fasteners. For example, one or more threaded fasteners may secure the sifting portion to the funnel portion.

The septum may include one or more slits. One or more slits may function to impart additional flexibility to one or more portions of a septum, allow clean litter to flow back into a main interior of a chamber, or both. One or more slits may be formed in and/or adjacent to one or more hinges, sifting portions, or both. One or more slits may be formed in one or more sieve sections, guide sections, lead sections, or any combination thereof. One or more slits may be formed from one or more edges toward an interior of a section. One or more slits may be formed at a rearmost edge of a guide section, extend toward the front of the septum, only partially extend through the guide section, or any combination thereof. The one or more slits may extend about 5% or greater, about 10% or greater, about 15% or greater, or even about 25% or greater across a length of a guide section. The one or more slits may extend about 50% or less, about 40% or less, or even about 30% or less across a length of a guide section. The one or more slits may have a shape which is substantially linear, nonlinear, or both. The one or more slits may have a shape which is straight, bowed, angled, or any combination thereof. The slit may curve away from a hinge, toward a sieve section, or both. The slit may have a width. The width may be about 0.02 inches (0.05 cm) or greater, about 0.05 inches (0.13 cm) or greater, about 0.07 inches (0.18 cm) or greater. The width may be about 0.5 inches (1.27 cm) or less, about 0.3 inches (0.76 cm) or less, or even about 0.2 inches (0.51 cm) or less. For example, the width may be about 0.08 inches (0.20 cm) to about 0.18 inches (0.46 cm). The slit may be particularly advantageous by imparting flexibility on the sifting portion when the mass of the litter from the temporary storage area applies force on the sifting portion when a chamber is returning to a home position. This flexibility guides the litter toward the gap as opposed to through the sieve section and thus aids in reducing the amount of dust and debris created during the cleaning cycle.

The septum may include a funnel portion. The funnel portion may be configured to affix the septum to an interior of the litter device. The funnel portion may be statically affixed to an interior of the chamber. The funnel portion may be affixed to an upper chamber. The funnel portion may rotate with and/or remain affixed to the chamber during rotation. The funnel portion may have a funnel surface, tapered shape, funnel neck, funnel opening, or any combination thereof. The tapered shape of the funnel surface may function to guide or funnel the waste material toward the funnel neck, funnel opening, or both. The funnel portion may be affixed to the chamber. The funnel portion may be affixed to the chamber via a funnel neck, one or more fasteners, the funnel surface, or any combination thereof. For example, one or more fasteners may secure the funnel surfaces, funnel necks, or both to the chamber. The funnel portion may remain substantially static relative to a chamber during rotation of the chamber, cleaning cycle, or both. The funnel portion may be substantially non-planar, planar, or both. The funnel portion may be non-planar due to being tapered. The funnel surface of the funnel portion may be tapered toward a funnel neck, funnel opening, or both. The funnel portion may have a cross-sectional shape reciprocal with at least a portion of an interior of the chamber. The funnel portion may have a cross-sectional or two-dimensional shape which is generally D-shaped, C-shaped, circular, square, rectangular, the like, or any combination thereof. The funnel portion may be generally conically shaped (wider at the outer edge and narrowing at the funnel neck), conically shaped with a flatter side, and/or the funnel portion may have an overall length and/or width about equal to or smaller than an interior diameter and/or interior chord length of the chamber. The funnel portion may be affixed to the sifting portion via a hinge, mechanical attachment, integrally formed therewith, or any combination thereof. The funnel portion may have an outer edge about its periphery. The outer edge may include and/or be free of a rim.

A funnel portion may include a funnel opening. A funnel opening may function to allow waste to exit from an interior of the chamber, through a waste opening, into a waste drawer or waste receptacle, or any combination thereof. The funnel opening may be formed at the narrowest part of a funnel portion. The funnel surface of the funnel portion may taper toward the funnel opening. The funnel opening may be formed through a funnel neck. The funnel neck may be where the funnel surface tapers toward, a taper ends, or both. The funnel neck may be a protrusion which extends away from the funnel surface. The funnel neck may extend toward an interior of the chamber, extend through a waste opening, extend out of the chamber, or any combination thereof. The funnel neck may be configured to be adjacent to, located within, affixed to, or any combination thereof the waste opening of a chamber. The funnel neck may nest within the waste opening of a chamber. The funnel neck may have a shape substantially reciprocal with a waste opening of a chamber. The funnel neck and/or funnel opening may have a cross-sectional or two-dimensional shape which is substantially square, rectangular, circular, ovoid, triangular, the like, or any combination thereof.

A funnel portion may include a ramp. The ramp may function to change the speed of waste as it transitions from the sifting portion to the funnel portion, guide where waste is collected within a waste bin, or both. The ramp may be formed as part of the funnel portion. The ramp may be located between a funnel opening and hinge, sifting portion, or both. The ramp may extend fully or partially between a rear and front of the funnel portion. The ramp may provide an incline, decline, or both in surface. The ramp may be non-planar, planar, or both. The ramp may be provided as a convex contour along a width and/or length of the funnel portion. The ramp may be a bump between the hinge and the funnel opening. The ramp may function to decrease a speed at which waste is moving from the sifting portion to the funnel portion. The ramp may function to decrease the speed of waste before the waste enters the funnel opening, exits the chamber, or both. By decreasing a speed of the waste, the waste may be prevented from prematurely entering the funnel opening, the waste opening of the chamber, the waste bin, the like, or any combination thereof. This may aid in better guiding how waste collects in the waste bin, avoid waste building up skewed toward one side of the waste bin (e.g., left side), or both.

The septum may include a rear cover. A rear cover may function to cover an opening through which litter passes through, prevent one or more animals from inserting one or more limbs or the like in a litter refill opening, provide a barrier from one or more animals eliminating urine or feces in the litter refill opening, or any combination thereof. The one or more rear covers may be part of the funnel portion, sifting portion, or both. The one or more rear covers may be formed as part of the funnel portion. The one or more rear covers may be located at a rear of the septum. A rear may be defined as a portion of the septum which faces away from an entry opening of a litter device, is adjacent to a litter refill opening, or both. The rear cover may project from one or more edges. The rear cover may project from an outer edge of the funnel portion. The rear cover may project in a generally opposing direction as a funnel neck. The rear cover may have a cross-sectional or two-dimensional shape which is substantially D-shaped, C-shaped, circular, oval, square, rectangular, the like, or a combination thereof. The rear cover may have a cross-sectional shape substantially reciprocal to and/or similar to a litter refill opening of a chamber. The rear cover may be distanced from a chute and/or wall from which fresh litter is delivered, create a gap for litter to enter the chamber, or both. The rear cover may provide a discreet barrier which hides the litter refill opening and/or a portion of the litter dispenser engaged within the litter refill opening from view from the entry opening, within the chamber, or both. By providing a discreet barrier, an animal may not become curious or aware of the litter refill opening and/or litter dispenser when using the litter device. By providing a discreet barrier, the interior of the chamber may be more visually appealing to individuals (i.e., pet owners) as the interior of the chamber has a cleaner interior surface, both aesthetically (blends with interior surface) and physically (i.e., easier to clean).

The septum may be comprised of a suitable material. The material may be non-stick; liquid impenetrable; resistant to damage, penetration, scent absorption, stain, or a combination thereof by litter, waste, liquids, solids, semi-solids, or a combination thereof. The septum material may be rubber, a polymeric material, a synthetic material, a natural material, or any or a combination thereof. The septum may be made of the same material or differing materials. For example, the living hinge, funnel portion, and sifting portion may be comprised of the same one or more materials.

Septum Integrated into Litter Device

The present teachings relate to a device that includes litter for use by an animal. The device may be a litter device. The litter device may be an automated litter device. The device may function to retain litter, sort used litter from unused litter, collect animal waste, remove animal waste, divide animal waste from litter, temporarily store animal waste, or any combination thereof. The device may have the ability to replace used litter with unused litter. The device may be used by one or more domesticated animals. One or more domesticated animals may include one or more cats, rabbits, ferrets, pigs, dogs, ducks, goats, foxes, the like, or any combination thereof. The device may be compatible with one or more types of litter. One or more types of litter may include clumping clay, non-clumping clay, silica gel crystals, recycled paper, pine, corn wheat, walnut shells, the like, or any combination thereof. The litter device may include a base, chamber, bonnet, waste drawer, bezel, one or more accessories, one or more sensors, filtering system, storage unit, the like, or any combination thereof.

The litter device includes a chamber. The chamber may function to house clean litter, provide a space for an animal to enter and excrete waste, or both. The chamber may have any size and shape which is able to retain sufficient litter for an animal to use during waste elimination, allow for an animal to comfortably use the litter box, or both. The chamber may have a three-dimensional shape which is substantially spherical, ovoidal, cylindrical, cuboidal, conical, pyramidical, the like, or any combination thereof. A shape which is substantially spherical, ovoidal, cylindrical, and/or the like may be beneficial in providing for rotation of the chamber during a cleaning cycle, avoiding litter and/or waste from collecting along one or more vertices, or a combination thereof. For example, the chamber may be shaped like a globe, sphere, football, egg, the like, or a combination thereof. The chamber may be configured to retain litter. The chamber may be supported by a base. The chamber may be capable of rotation during a cleaning cycle. The chamber may be rotatably supported by a base. The base may be located between the chamber and a surface upon which the litter device rests. The chamber may have a generally hollow interior to accommodate one or more septums, liners, litter, and the like. The chamber may include an entry opening, waste opening, or both. The chamber may have a generally hollow interior to accommodate one or more animals during use. The chamber may have a size which is able to accommodate one or more animals which are about 1 kg or greater, about 2 kg or greater, about 4 kg or greater, about 8 kg or greater, or even about 10 kg or greater. The chamber may have a size which is able to accommodate one or more animals which are about 30 kg or less, about 25 kg or less, about 20 kg or less, or even about 15 kg or less. The hollow interior may form a volume of the chamber. The volume of the chamber may be about 16,000 $cm^3$ or greater, about 32,500 $cm^3$ or greater, or even about 65,000 $cm^3$ or greater. The volume of the chamber may be about 150,000 $cm^3$ or less, about 100,000 $cm^3$ or less, about 85,000 $cm^3$ or less, or even about 75,000 $cm^3$ or less. The chamber may have a volume that is usable by an animal which can fit through an entry opening. The usable volume may be any volume such that the chamber may be used by an animal to excrete waste. The usable volume may be any volume such that an animal can enter, turn, and move around within the chamber. The volume of the chamber may be the usable volume, the total volume, or both. The usable volume may be the volume within the hollow interior of the chamber minus the volume occupied by litter and any components internally located within the chamber. The total volume may be the actual volume of the hollow interior of the chamber. The chamber may be formed by a single piece or a plurality of pieces. The chamber may include one or more filter systems affixed thereto, in fluid communication therewith, or both. The chamber may be formed by a single piece having a substantially spherical shape. The chamber may be formed by two or more pieces which mate to form a substantially spherical shape. The chamber may be formed by an upper chamber and lower chamber.

The chamber may include an axis of rotation. The axis of rotation may function as the relative axis about which the chamber rotates during one or more cleaning cycles. The axis of rotation may have any orientation such that the usable volume of a chamber is increased; the litter relative to the chamber has a conical rotation; litter is funneled toward a rear of the chamber (e.g., away from the front opening), toward and through a screen and/or septum, or both; a larger entry opening may be used without litter spilling therefrom; a screen and/or septum can be located further back in the chamber creating more internal space; or any combination thereof. The axis of rotation of the chamber may form an angle with a vertical plane, horizontal plane, or both. A vertical plane may be substantially in the direction of gravity, parallel to gravity, or both. A horizontal plane may be substantially perpendicular to a direction of gravity, parallel to a surface upon which the litter device rests, or both. The axis of rotation of the chamber may form any angle with a vertical plane, horizontal plane, or both so that one or more of the teachings herein are achieved. The axis of rotation may form an angle of about 88 degrees or less, about 85 degrees or less, about 80 degrees or less, about 75 degrees or less, or even about 70 degrees or less with a vertical plane. The axis of rotation may form an angle of about 40 degrees or greater, about 45 degrees or greater, about 50 degrees or greater, about 55 degrees or greater, about 60 degrees or greater, or even about 65 degrees or greater with a vertical plane. The axis of rotation may form an angle of about 40 degrees to about 88 degrees, of about 55 degrees to about 80 degrees, of about 40 degrees to about 85 degrees, or even about 60 degrees to about 75 degrees with a vertical plane. The axis of rotation may form an angle with the horizontal plane that is complementary to the angle relative to the vertical plane. The axis of rotation may extend from a rear toward a front of the chamber. The axis of rotation may extend through an entry opening, a litter fill opening, a rear cover, the like, or a combination thereof. The axis of rotation may be substantially concentric or of-center with an entry opening, litter refill opening, rear cover, the like, or a combination thereof. The axis of rotation of at angle may funnel clumps of waste and/or litter, waste, or both toward a common location. The common location may be located toward a rear, bottom, or both of the chamber. The common location may be a septum, screen, waste opening, waste bin, or any combination thereof. The axis of rotation may allow for a single waste opening to be used, waste to be funneled toward the waste opening, waste to transfer from the waste opening to a waste bin or receptacle, or any combination thereof.

The axis of rotation being at an angle along with the frictional characteristics of the litter may result in a litter bed with an angle of repose. The angle of repose may function so that litter is angled away from an entry opening, litter is prevented from spilling from an entry opening, an entry opening may be as large as possible while keeping litter within the chamber, or any combination thereof. The angle of the litter bed may be angled such that the litter is angled away from an entry opening. Angled away from an entry opening may mean that a depth of the litter proximate to an entry opening is smaller than a depth of the litter more distant from the entry opening (e.g., the litter depth increases as the distance of the litter increases from the entry opening). The angle of the litter bed may be any angle such that the ability of an animal accidentally moving litter outside of opening is reduced compared to a litter bed that is free of an angle. Free of an angle may mean about perpendicular to the vertical plane, parallel to the horizontal plane, or both. The angle of the litter bed may form an angle that is about 89 degrees or less, about 88 degrees or less, about 87 degrees or less, or even about 85 degrees or less with the vertical plane. The angle of the litter bed may form an angle that is about 70 degrees or greater, about 75 degrees or greater, or even about 80 degrees or greater with the vertical plane. For example, the angle of the litter bed may be about 75 degrees to about 88 degrees, or even about 80 degrees to about 87 degrees with the vertical plane. The litter bed may rest on any surface of the chamber.

The chamber includes an entry opening. The entry opening allows for one or more animals to comfortably enter and exit the chamber. The entry opening may be any size and shape so that one or more animals may enter and exit the chamber. The entry opening may be any size and shape so that during entry, use, and/or exiting by an animal; during one or more cleaning cycles; or any combination thereof litter is substantially maintained within the chamber. The entry opening may have a profile shape and/or cross-section which is substantially circular, ovular, elliptical, square, rectangular, trapezoidal, triangular, rhombus, the like, or any combination thereof. The profile shape may be a shape looking at an opening plane straight on, perpendicular, or both. The entry opening may have a profile shape which is symmetrical, non-symmetrical, or both. An entry opening which is circular, ovular, or the like may offer a more comfortable and larger entry area, may avoid sharp vertices that may scratch an animal, may avoid sharp vertices which may catch litter upon exit of the animal from the chamber, or a combination thereof.

The chamber includes one or more waste openings. The one or more waste openings may function to allow waste, used litter, or both to transfer from the chamber into the base, waste bin, or both. The waste opening may be at any location in the chamber so that the waste, used litter, or both may transfer from the chamber into a waste bin. The waste opening may be at any location in the chamber that aligns with the waste bin during a cleaning cycle, off-set from the waste bin while in a home position, or both. The waste opening may be formed as an aperture in an upper chamber, lower chamber, or both. For example, the waste opening may be formed as an aperture in the upper chamber such that it resides substantially opposite the waste bin while the chamber is in a home position. The waste opening may have any shape suitable for allowing waste to quickly transfer from the chamber to the waste drawer during a cleaning cycle. The waste opening may have a cross-sectional shape which is substantially circular, ovular, square, rectangular, trapezoidal, triangular, rhombus, the like, or any combination thereof. The waste opening may have a shape which is reciprocal with a cross-sectional shape of the waste bin. The waste opening may be located partially or completely on one side of a longitudinal plane of the device. The longitudinal plane may intersect the rotational axis, vertical plane, horizontal plane, or a combination thereof. The rotational axis, vertical plane, or both may be parallel to, lie within, or both to the longitudinal plane. The horizontal plane may be substantially perpendicular to the longitudinal plane. The longitudinal plane may divide the litter device into side halves. The side halves may each comprise a portion of the bonnet, chamber, and base. The side halves may be substantially symmetrical and/or mirrored about the longitudinal plane. Substantially symmetrical may still allow for certain features to be only located on one side of the device, such as a waste opening. A center of the waste opening may be offset from the longitudinal axis by an angle. A center of the waste opening may be angled from the longitudinal plane by about 0° or more, about 5° or more, about 10° or more, about 15° or more, or even about 20° or more. A center of the waste opening may be angled from the longitudinal plane by about 45° or less, about 35° or less, about 30° or less, or even about 25° or less. The angle may be measured when a chamber is in a home position. The waste opening may be located on one or more sides of a track. The waste opening may be located between an entry opening and a track. The waste opening, while the chamber is in a home position, may not overlap with the waste bin. The waste opening, during a cleaning cycle, may substantially align, overlap, or both with a waste bin. The waste opening, during a cleaning cycle, may be rotated about the rotational axis. The waste opening, during a cleaning cycle, may rotate from a home position to an emptying position, a home position, any position therebetween, or a combination thereof. The emptying position may be when the chamber is rotated such that the waste opening is located adjacent to, overlapping with, substantially centered with, or a combination thereof the waste bin. The waste opening, during a cleaning cycle, may rotate by an angle of about 130° or greater, about 145° or greater, about 150° or greater, about 155° or greater, or even about 160° or greater to an emptying position. The waste opening, during a cleaning cycle, may rotate by an angle of about 230° or less, about 220° or less, about 200° or less, or even about 180° or less to an emptying position. The waste opening may rotate a complete revolution (e.g., 360°) from the start of a cleaning cycle to the end of a cleaning cycle. Rotation of the waste opening may occur when a track is rotated. Rotation of a track may rotate the chamber and the waste opening.

The chamber may include a rotation device. The rotation device may function to rotate the chamber about a rotational axis, rotate the chamber during a cleaning cycle, or both. The rotation device may be a track, gear, high friction surface, raised area, toothed area, contact surface area, the like, or a combination thereof. The rotation device may be affixed to, integral with, in rotational communication with, or a combination thereof the chamber. The rotation device may be located on an exterior, interior, or both of the chamber. The rotation device may be a belt, a cog, a sprocket, a toothed assembly, rollers, a wheel, the like, or a combination thereof. The chamber may include a track about at least a portion of an exterior of the chamber. The base may include one or more drive sources in rotational communication with and which drives the rotation device.

The litter device includes a base. The base may function to support a chamber, house a waste drawer, house one or more electrical components, or any combination thereof. The base may have any size and shape so that the base may support the chamber, house a waste drawer, and/or house one or more electrical components. The base may rotatably support the chamber. The base may allow the chamber to rotate during one or more cleaning cycles. The base may be configured to rest on a surface. A surface may be any suitable surface for having a litter device resting thereon. The surface may be a floor, table, platform, substantially planar surface, or any combination thereof. The base may include one or more base frames, waste drawers, drawer cavities, chamber supports, steps, electrical components, ports, filters, the like, or any combination thereof.

The litter device includes a waste receptacle. The waste receptacle may function to collect waste, temporarily store waste, prevent malodors related to waste from exiting the device, or any combination thereof. The waste receptacle may have any shape and size that allows the waste drawer to collect and temporarily store waste. The waste receptacle may be located within a base, within a drawer cavity, between a chamber support and a bottom of a base, between a bottom of a base and the chamber, or any combination thereof. The waste drawer may be any size and/or shape such that it is able to temporarily collect and store waste. The waste receptacle, or portions thereof, may have a three-dimensional shape which is substantially spherical, ovoidal, cylindrical, cuboidal, conical, pyramidical, the like, or any combination thereof. For example, a waste receptacle may have a shape which is substantially cuboidal and hollow. The waste receptacle may be referred to as a waste drawer. The waste receptacle may slide within a plane. The waste receptacle may be removably located within the base. The waste receptacle may be at least partially located within a waste receptacle cavity. The plane may be parallel or offset relative to a horizontal plane. The waste receptacle may include a waste bin, drawer front, step, handle, or any combination thereof. A drawer front may form all or a portion of a forward-facing surface (e.g., same side as an entry opening) of the base. A drawer front may align with an exterior of a base frame so as to conceal the drawer cavity. A drawer front may have a cross-sectional shape substantially reciprocal with a cross-sectional shape of a drawer opening in the base frame. A reciprocal shape may allow for the drawer cavity by the drawer front to be completely sealed when the waste receptacle is located within the drawer cavity. The drawer front may be affixed, integral with, or both to a waste bin. The drawer front may be forward-facing relative to the waste bin.

Method of Sifting and Funneling Litter with a Septum During a Cleaning Cycle

The litter device may complete one or more cleaning cycles. A cleaning cycle may function to transfer waste from within a chamber into a base, waste drawer, or combination thereof. A cleaning cycle may function to sort clean litter (e.g., unused litter) from waste, used litter, clumps, lumps, or any combination thereof. A cleaning cycle may be initiated after one or more presence sensors sense an animal has exited the chamber, waste has been deposited within the chamber, a user has initiated a cleaning cycle, or any combination thereof. A cleaning cycle may begin with rotation of a chamber. A chamber may be driven by a track, drive mechanism, or both. A chamber may be driven by a track affixed thereto. The track may be driven by a drive mechanism. The chamber may rotate clockwise, counter-clockwise, or both. Rotation direction may be determined by the location of the septum, the sifting portion relative to the funnel portion, a waste opening, or a combination thereof. During a cleaning cycle, the chamber may rotate from a home position to an emptying position, from an emptying position to a home position, from an emptying position to a leveling position, from a home position to a leveling position, from a leveling position to a home position, or any combination thereof. For example, a cleaning cycle may comprise rotation of the chamber from a home position to an emptying position, from the emptying position to a leveling position, and from the leveling position back to the home position. Rotation from the emptying position to the leveling position may include passing the home position. The home position may be a resting position of the chamber suitable for an animal to use the litter device. The emptying position may allow for waste to transfer to a waste receptacle. In the emptying position the waste opening may be aligned with the waste receptacle. The leveling position may allow for litter to level itself along a bottom chamber, liner, or both before returning to a home position.

Rotation of the chamber may be about the rotational axis of the chamber. The chamber may rotate during a cleaning cycle by about 10 degrees or more, 20 degrees or more, 30 degrees or more, about 50 degrees or more, about 90 degrees or more, about 100 degrees or more, about 180 degrees or more, about 205 degrees or more, about 245 degrees or more, or even about 270 or more. The chamber may rotate by about 540 degrees or less, about 500 degrees or less, about 400 degrees or less, or even about 360 degrees or less. The chamber may rotate in a single direction or two directions about the rotational axis. The chamber may rotate in a first direction, second direction, or both. The first direction may be counterclockwise, clockwise, or both. The second direction may be clockwise, counterclockwise, or both. The second direction may be opposite the first direction. Clockwise and counterclockwise may be determined by facing toward the entry opening from outside of the litter device. The chamber may rotate in either direction a single time or a plurality of times. The chamber may rotate in a first direction and then a second direction. The chamber may rotate in a second direction and then a first direction. The chamber may rotate in a first direction then a second direction and again in a first direction. The chamber may rotate in a first direction from a home position to and/or past an emptying position, from an emptying position toward a home position, from a leveling position to a home position, or a combination thereof. The chamber may rotate in a second direction from an emptying position to and/or past a home position, from the emptying position to a leveling position, from a home position to a leveling position, or any combination thereof. For example, the chamber may rotate in a first direction from a home position to an emptying position, then in a second direction from an emptying position to a leveling position (e.g., past the home position), and then in the first direction from the leveling position back to the home position. For example, the chamber may rotate between about 160 degrees and about 220 degrees, or even between about 180 degrees and 210 degrees, in a first direction from a home position to an emptying position. For example, the chamber may rotate about 170 degrees to about 265 degrees, or even between about 200 degrees and 245 degrees, in a second direction (e.g., opposite as first direction) from an emptying position to a leveling position. For example, the chamber may rotate about 10 degrees to about 45 degrees, or even about 20 degrees to about 40 degrees, in a first direction from a leveling position to a home position. An example of how the chamber may rotate may be described in U.S. Pat. No. 8,757,094 and US Patent Application Publication No. 2013/0333625, incorporated herein by reference. Another exemplary explanation of how a cleaning cycle may function may also be found in US Patent Application Publication No. 2019/0364840, incorporated herein by reference.

During a cleaning cycle, a septum may sift through the litter within the chamber. The septum may divide unused litter from waste. During a cleaning cycle, rotation of the chamber may result in the septum rotating towards the litter. The sifting portion of a septum may lead (e.g., approach/contact first) while the funnel portion of the septum may trail (e.g., approach/contact latter) toward the litter. A lead section of the sifting portion may lead, followed by a sieve section, and then a guide section.

During the beginning of a cleaning cycle, the chamber may rotate counterclockwise, in a first direction, from a home position to an emptying position, or any combination thereof. During this rotation, the waste opening and septum may move closer to the waste receptacle. Due to gravity, the litter may come into contact with the septum. The litter may first come into contact with the leading edge and then the lead section. Upon contact with the litter, the lead section may initially be located between the litter and the inner wall of the chamber. As the sifting portion moves toward and into the litter, the litter may then come into contact with the sieve section. The sieve section may sift through the litter and separate waste and other large particles from the unused litter. Clean, unused litter may pass through the plurality of sieve openings of the sieve section toward an inner wall of the chamber. The clean, unused litter may be temporarily stored in a temporary storage area formed between the sifting portion (such as the guide section) and the inner wall of the chamber. Waste and other large particles remain on a side of the sifting portion facing toward the interior of the chamber. As the chamber continues to rotate in the first direction, the waste transfers (e.g., slides across) from the sieve section to the guide section, over the hinge, and then to the funnel portion due to gravity. When the waste opening and funnel opening align with the waste bin in an emptying position, the waste may be funneled from resting on the funnel surface toward the funnel opening, then through the waste opening, and then into the waste bin. During the cleaning cycle, by separating the waste from the unused litter, the waste may be able to be funneled toward the funnel opening, waste opening, or both for disposal into a waste drawer while unused litter may be able to be reused.

After the cleaning cycle reaches the emptying position, the chamber may rotate in a second direction, opposite the first direction, clockwise, from an emptying position toward a home position, from an emptying position to a leveling position, or any combination thereof. As the chamber may rotate in the second direction, the litter (e.g., unused, clean litter) may move back toward the sifting portion of the septum. As the chamber rotates in the second direction, the litter (e.g., unused, clean litter) may move under the sifting portion, between the sifting portion and an inner wall of the chamber, through a plurality of sieve openings of the sifting portion, or any combination thereof. All or a majority of the litter (e.g., unused, clean litter) may move under the sifting portion in a gap between the leading edge and the inner wall of the chamber. As the chamber rotates in the second direction, the litter may move back to rest on a lower portion of the chamber (e.g., lower chamber, liner, or both).

During a cleaning cycle, the chamber may rotate in a second direction toward a leveling position, past a home position toward a leveling position, or both. The leveling position may allow for the litter to level itself on the lower chamber, liner, or both. The leveling position may allow for the litter to overcome surface friction with the liner, inner wall of the chamber, or both. The leveling position may allow for the litter to return to an angle of repose.

During a cleaning cycle, the chamber may then rotate in a first direction from the leveling position back to a home position. Returning to the home position may allow for an animal to once again use the litter device.

During a cleaning cycle, a drive mechanism may drive the chamber at a steady speed, increasing speed, decreasing speed, or any combination thereof during a cleaning cycle. The chamber may be configured to slow down in rotational speed when used or clean litter is passing through the sifting portion such as to reduce dust and debris from becoming airborne. The chamber may reduce its rotational speed by about 5% to about 50%. The chamber is rotated at a speed of about 0.25 RPM or greater to about 2 RPM or less.

Illustrative Examples

FIG. 1 illustrates a septum 1. The septum 1 includes a funnel portion 10 and a sifting portion 12. The sifting portion 12 includes a leading edge 14. The leading edge 14 defines a periphery of a lead section 16 of the sifting portion 12. Adjacent to the lead section 16 is a sieve section 18. The sieve section 18 includes a plurality of sieve openings 34. Adjacent to the sieve section 18 is a guide section 20. The sifting portion 12 is affixed to the funnel portion 10 via a hinge 22 (not shown). The funnel portion 10 includes a funnel opening 24. The funnel portion 10 is tapered from an outer edge 26 toward the funnel opening 24. The funnel opening 24 passes through a funnel neck 28.

Figure 2:
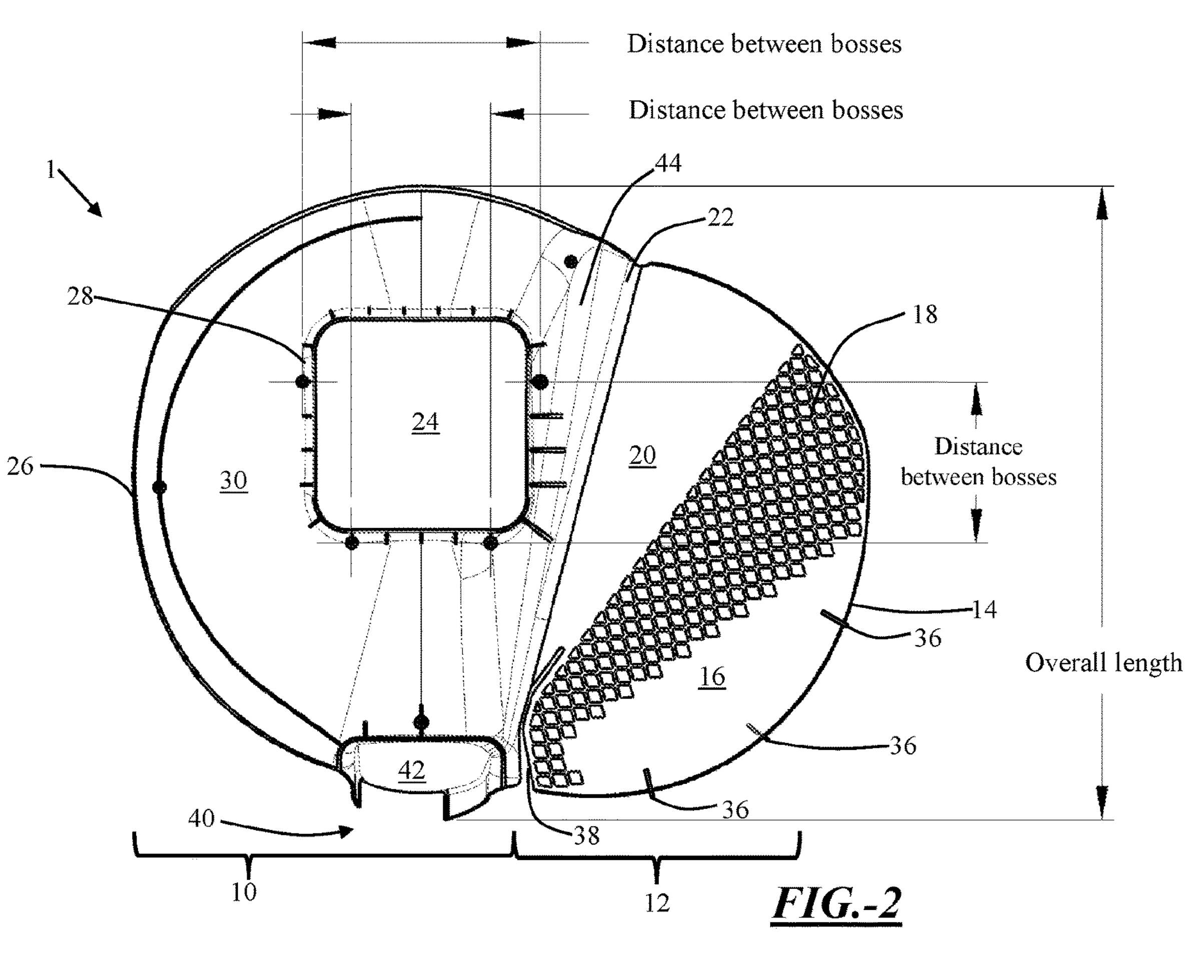
FIG. 2 is a top view of a septum.

FIG. 2 illustrates a septum 1. The septum 1 includes a funnel portion 10 adjacent to a sifting portion 12. The funnel portion 10 is connected to the sifting portion 12 via a hinge 22. The sifting portion includes a leading edge 14. The leading edge 14 defines the boundary of the sifting portion 12. The sifting portion 12 includes a plurality of spacers 36. The spacers 36 are formed as ribs protruding from the leading edge 14. The leading edge 14 defines the periphery of a lead section 16. A sieve section 18 is located between a lead section 16 and a guide section 20. Adjacent to the sifting portion 12 is a hinge 22. The hinge 22 is adjacent to and integral with the guide section 20. The hinge 22 is also adjacent to the funnel portion 10. In other words, the hinge 22 is connected to both the funnel portion 10 and the sifting portion 12. A slit 38 is also formed between the funnel portion 10 and the sifting portion 12. The slit 38 extends from an edge of the guide section 20 into the guide section 20. The slit 38 extends only partially into the guide section 20. The slit 38 is formed adjacent to a sieve section 18. The slit 38 is formed at a rear portion 40 of the septum 1. The septum 1 includes an opening cover 42. The opening cover 42 is located at the rear portion 40. The opening cover 42 is formed as part of the funnel portion 10. The funnel portion 10 has an outer edge 26. The outer edge 26 forms a rim of the funnel portion 10. The outer edge 26 is the outermost edge of the funnel surface 30. The funnel surface 30 is tapered toward a funnel opening 24. The funnel opening 24 passes through a funnel neck 28. The funnel portion 10 includes a ramp 44. The ramp 44 is located adjacent to the hinge 22. The ramp 44 extends from a rear portion 40 to the front of the septum 1.

Figure 3:
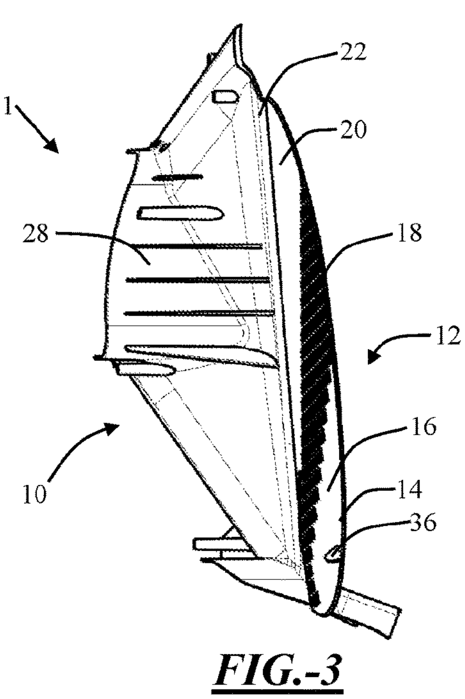
FIG. 3 is a side view of a septum

FIG. 3 is a side view of a septum 1. The septum 1 includes a sifting portion 12 adjacent to a funnel portion 10. The funnel portion 10 includes a funnel neck 28. The funnel neck 28 defines a void passing therethrough. The void is a funnel opening 24 (not shown). The funnel portion 10 is affixed to the sifting portion 12 via a hinge 22. The sifting portion 12 includes a guide section 20, sieve section 18, and lead section 16. The lead section 16 includes a leading edge 14. At the leading edge 14 is one or more spacers 36.

Figure 4:
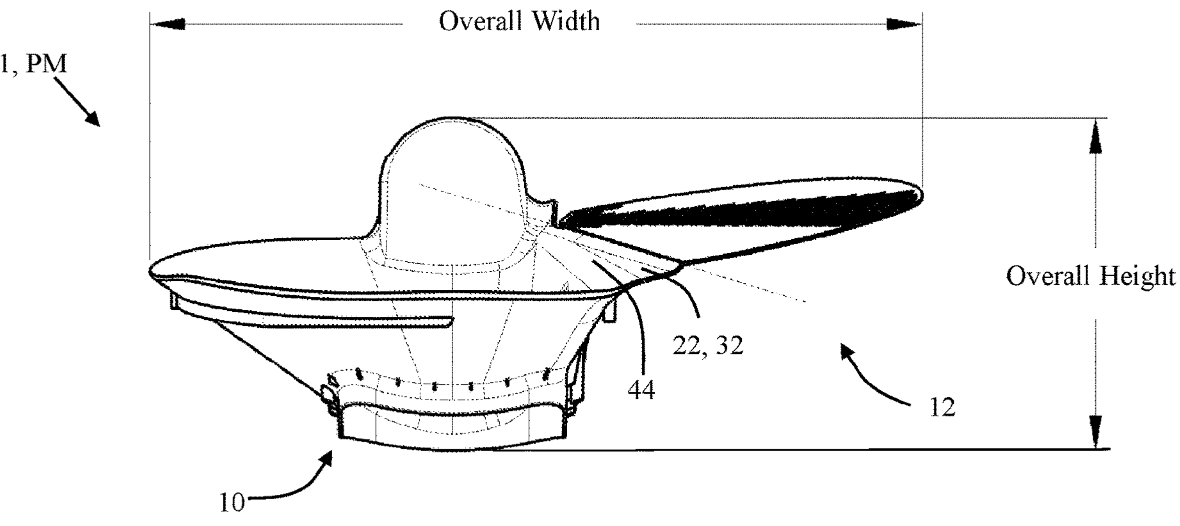
FIG. 4 is a front view of a septum in a mold position.
Figure 5:
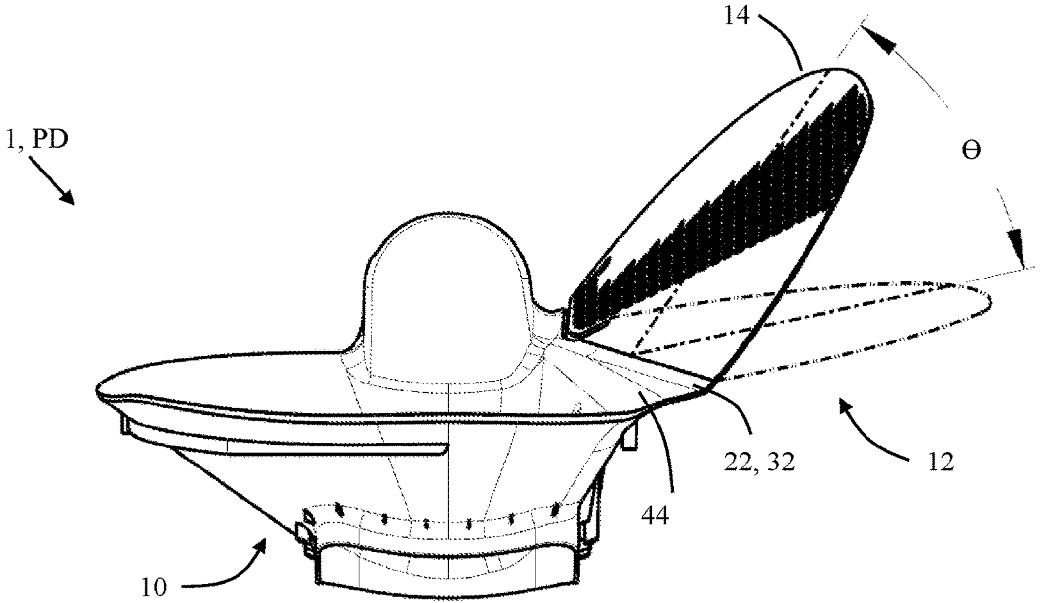
FIG. 5 is a front view of a septum in a design or in-use position.

FIGS. 4 and 5 illustrate a front view of a septum 1. FIG. 4 is the mold position PM of the septum 1. FIG. 5 is the design or in-use position PD of the septum 1. The septum 1 includes a hinge 22. The hinge 22 is formed as a living hinge 32. The sifting portion 12 is able to at least partially pivot about the hinge 22. The sifting portion 12 is able to pivot from the mold position PM to the design or in-use position PD. The sifting portion 12 may have an angle of rotation ⊖. The angle of rotation ⊖ may measure an angular displacement the sifting portion 12 is able to rotate about the hinge 22. The sifting portion 12 may also partially rotate about the hinge 22 during a cleaning cycle. During a cleaning cycle, the sifting portion 12 may rotate even further beyond the design or in-use position PD Adjacent to the hinge 22 is a ramp 44.

Figures 6, 7, 8:
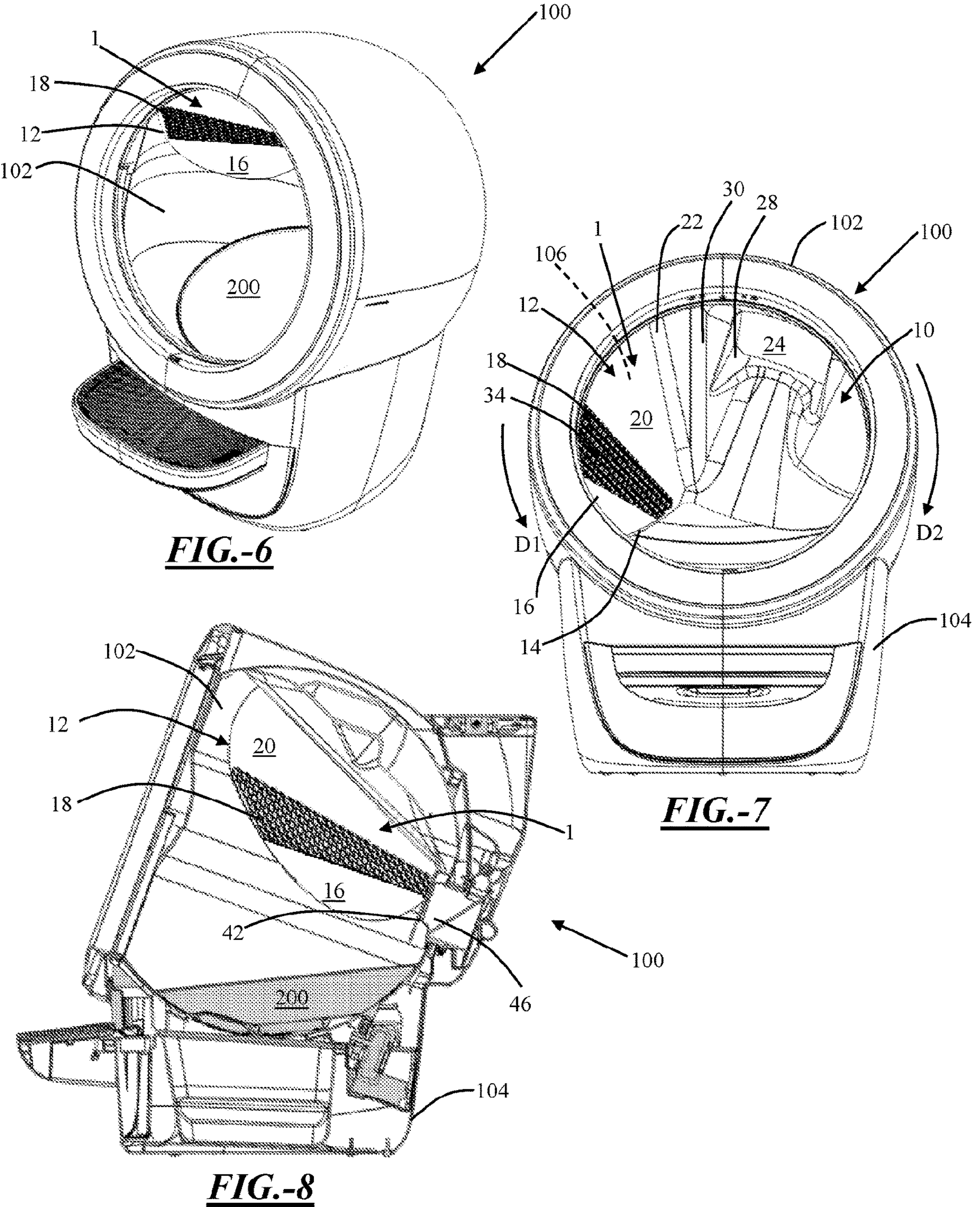
FIG. 6 is a perspective view of a litter device with a septum.
FIG. 7 is a front view of a litter device with a septum.
FIG. 8 is a cross-section view of a litter device with a septum.

FIG. 6 illustrates a septum 1 within a litter device 100. The litter device 100 includes a chamber 102. The septum 1 is located within the chamber 102. The septum 1 includes a lead section 16 adjacent to a sieve section 18. The lead section 16 is the section of the sifting portion 12 closest to a bed of litter 200 within the chamber 102.

FIG. 7 illustrates a litter device 100. The litter device 100 includes a chamber 102 rotatably supported by a base 104. Located within the chamber 102 is a septum 1. The septum 1 is able to conform to the curvature of the chamber 1 via the hinge 22. The chamber 102 is configured to rotate in both a first direction D1 and a second direction D2 during a cleaning cycle of the litter device 100. Upon rotation in the first direction D1, the septum 1 is configured to rotate at least partially into the bed of litter 200 (such as shown in FIGS. 6 and 8). During the cleaning cycle, sifting portion 12 rotates into and sifts the bed of litter 200. Specifically, the leading edge 14 first contacts the litter 200. Then the lead section 16 contacts the litter 200. Then the litter 200 comes into contact with the sieve section 18. The sieve section 18 sifts clean litter from waste material. The clean litter passes through the sieve openings 34 of the sieve section 18. The clean litter is then segregated and located between the sifting portion 12 and an interior wall of the chamber 102. Specifically, the clean litter is segregated into a temporary storage area 106. The temporary storage area is formed between the sieve section 18, the guide section 20, and an interior wall of the chamber 102. While the clean litter is segregated, the waste material moves from the sieve section 18 to the guide section 20. As the chamber 102 keeps rotating, the guide section 20 helps guide travel of the waste material toward and to the funnel portion 10. The waste material is transferred to the funnel surface 30 and is funneled toward the funnel opening 24. As the chamber 102 keeps rotating, the waste material exits the chamber 102 via the funnel opening 24. The chamber 102 rotates in an opposing, second direction D2 to return to a starting, home position. As the chamber rotates in the opposing, second direction D2, at least a majority of the unused, clean litter passes through a gap formed between the leading edge 14 of the sifting portion 12 and an interior surface of the chamber 102. This gap may be maintained by one or more spacers 36 (not shown).

FIG. 8 illustrates a litter device 100. The litter device 100 has a chamber 102 and a base 104. Within the chamber 102 is a septum 1 and a bed of litter 200. The septum 1 includes a sifting portion 12. The sifting portion 12 includes a lead section 16, sieve section 18, and guide section 20. The septum 1 includes a rear cover 42. The rear cover 42 conceals a litter refill opening 46.

Figure 9:
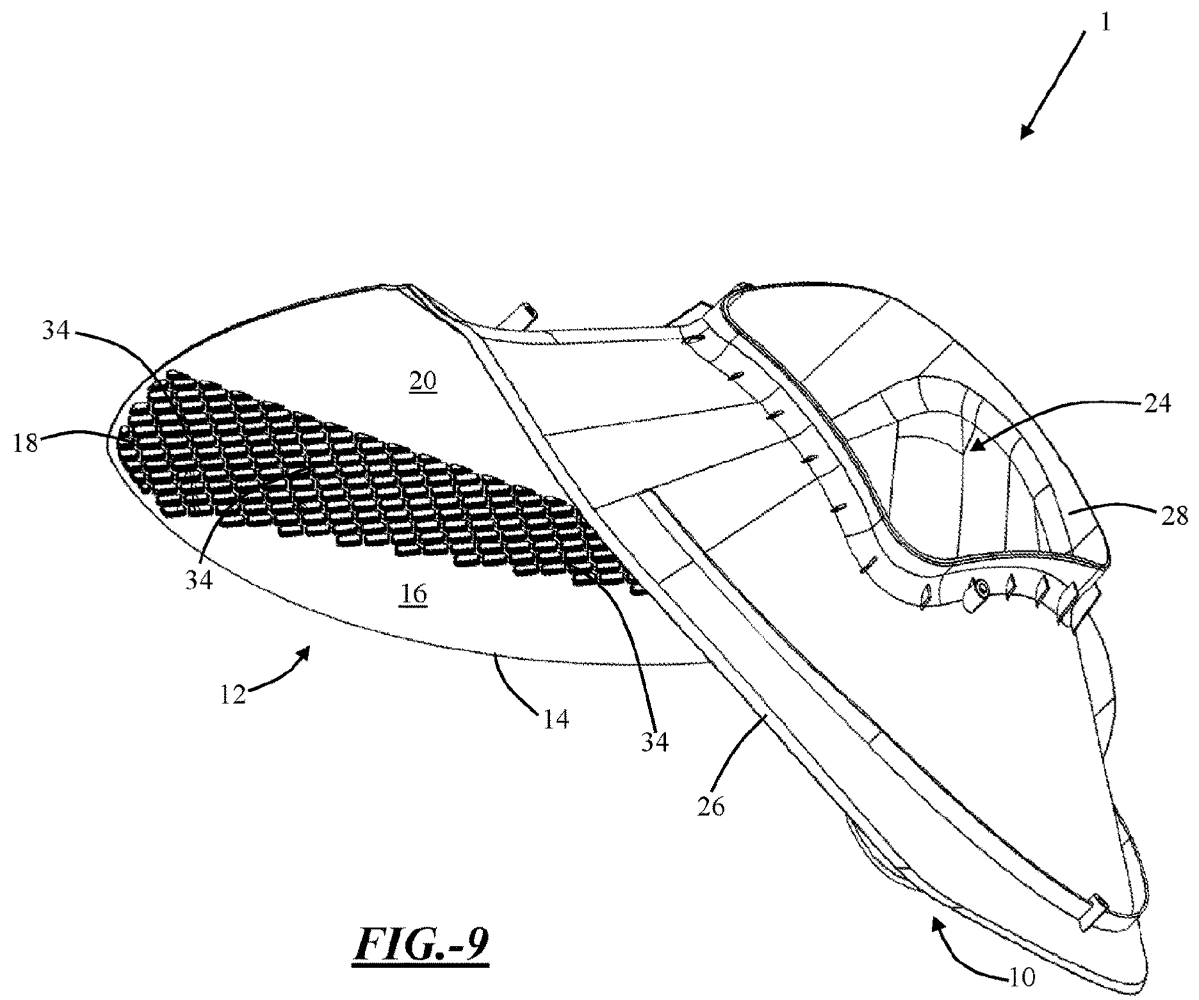
FIG. 9 is a perspective view of a septum.
Figures 10, 11:
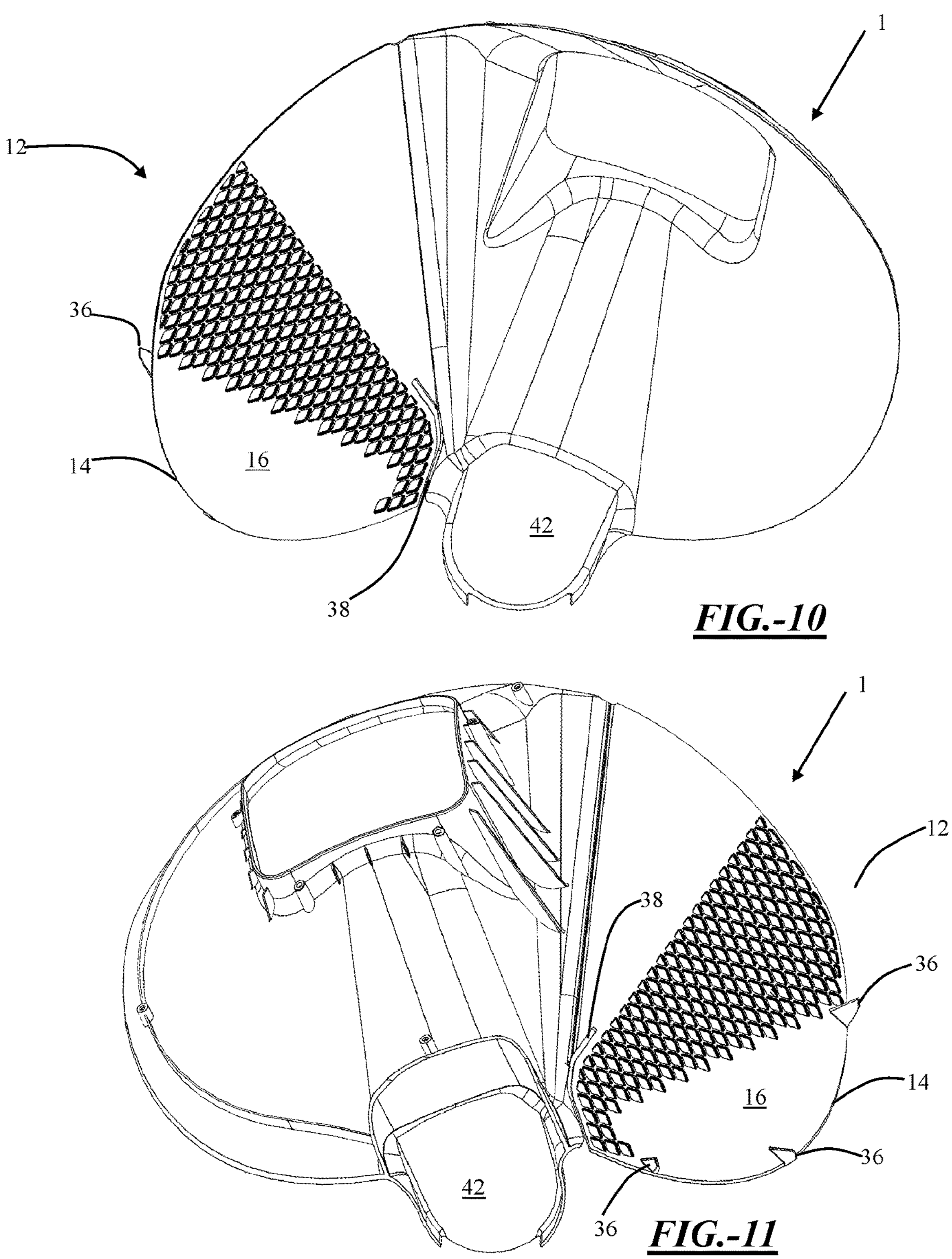
FIG. 10 is a bottom perspective view of a septum.
FIG. 11 is a top perspective view of a septum.
Figures 12, 13:
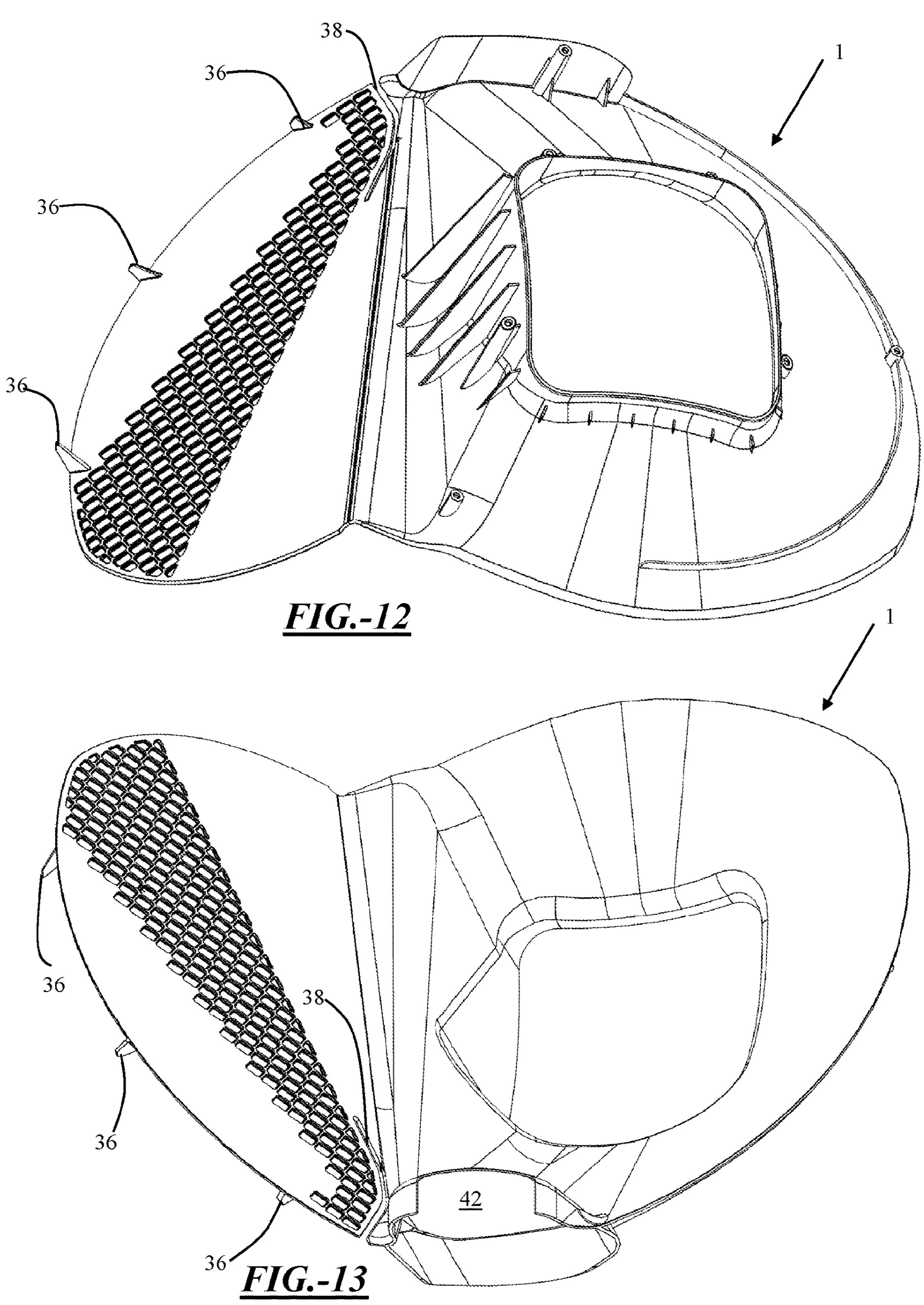
FIG. 12 is a top perspective view of a septum.
FIG. 13 is a bottom perspective view of a septum.
Figures 14, 15:
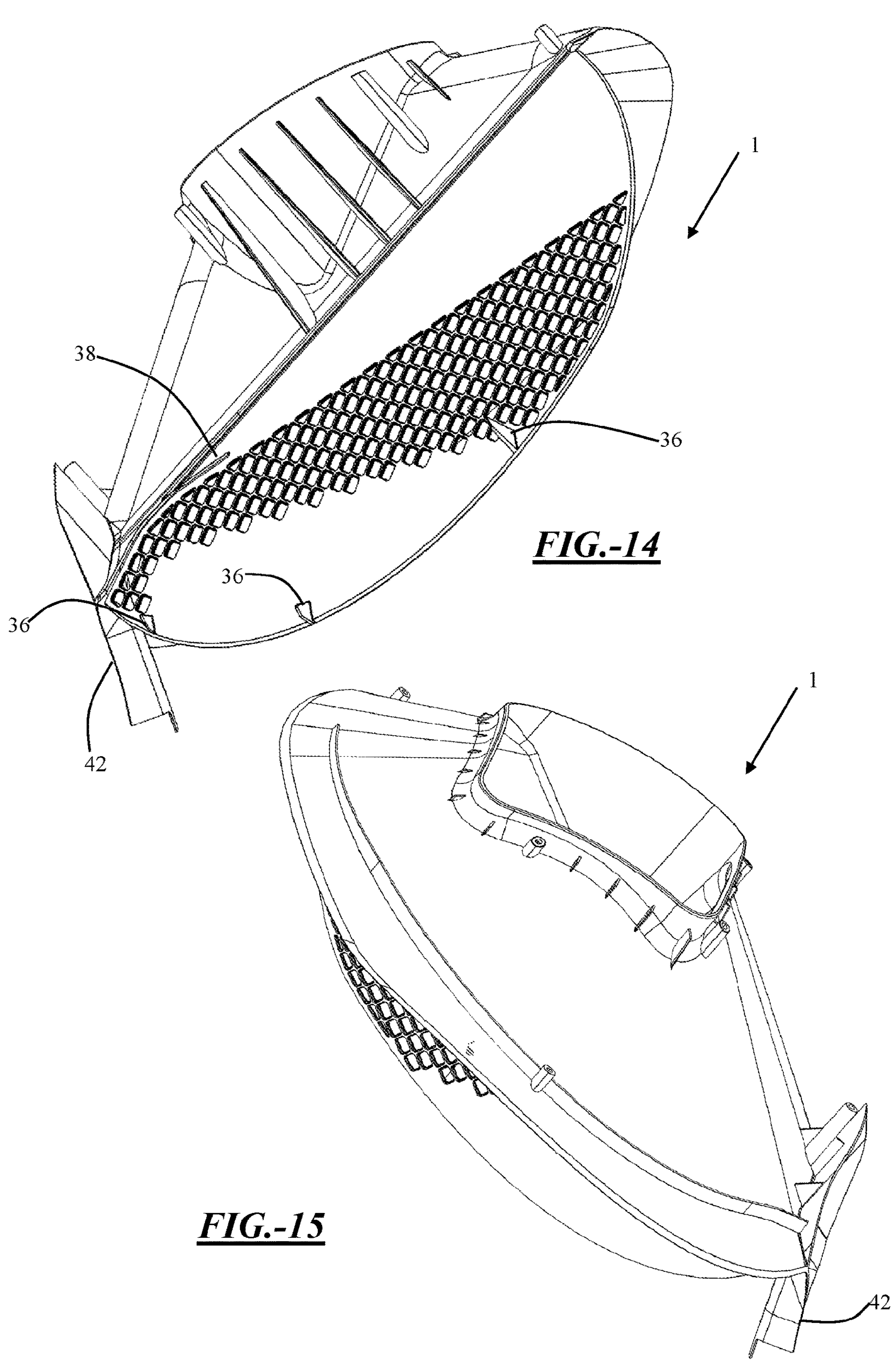
FIG. 14 is a left view of a septum.
FIG. 15 is a right view of a septum.

FIG. 9 illustrates a septum 1. The septum 1 includes a funnel portion 10 and a sifting portion 12. The funnel portion 12 is defined by an outer edge 26. The funnel portion 12 includes a funnel opening 24. The funnel portion 12 includes a funnel neck 28. The sifting portion 12 includes a lead section 16, sieve section 18, and guide section 20. The lead section 16 is defined by a leading edge 14. The sieve section 18 is defined by a plurality of sieve openings 34.

FIGS. 10-15 illustrate a septum 1. The septum 1 includes a plurality of spacers 36. The spacers 36 are formed as part of the sifting portion 12. The spacers 36 are formed on the lead section 16. The spacers 36 are formed adjacent to the leading edge 14. The spacers 36 have a shape reciprocal with the contour of an interior of a chamber. The spacers 36 have a fin-like shape. The septum 1 includes a slit 38. The slit 38 is also formed in the sifting portion 12. The septum 1 includes a rear cover.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A septum for sifting and funneling a waste material from a litter comprising:

a) a funnel portion having a tapered shape and a funnel opening, wherein the tapered shape is configured to guide or funnel the waste material toward the funnel opening;

b) a sifting portion connected to the funnel portion, wherein the sifting portion includes:

i) a lead section configured to first contact the litter and the waste material, wherein the lead section is about 20% to about 50% of a surface area of the sifting portion, and wherein the lead section is a substantially solid surface;

ii) a sieve section having a plurality of sieve openings configured to separate the waste material from the litter, wherein the sieve section is about 20% to about 50% of the surface area of the sifting portion;

iii) a guide section configured to allow the waste material to transition from the sieve section to the funnel portion; and iv) one or more spacers as part of the lead section and which are formed at or adjacent to a leading edge of the lead section, and wherein the one or more spacers are configured to project from an outward facing surface of the lead section toward an interior wall of a chamber of a litter device when the septum is installed in the litter device.

2. The septum of claim 1, wherein the sieve section is about 30% to about 40% of the surface area of the sifting portion.

3. The septum of claim 1, wherein the plurality of sieve openings have a cross-sectional shape which is substantially shaped like a diamond, circle, hexagon, square, rectangle, oval, ellipse, triangle, or any combination thereof.

4. The septum of claim 3, wherein the plurality of sieve openings have a diamond-shaped cross-section.

5. The septum of claim 1, wherein the plurality of sieve openings are each tapered such that one outer surface has a larger cross-sectional area than at an opposing outer surface or are chamfered from both outer surfaces.

6. The septum of claim 1, wherein the lead section is adjacent to the sieve section.

7. The septum of claim 1, wherein the leading edge defines an outer periphery of at least the lead section.

8. The septum of claim 1, wherein the lead section is about 30% to about 40% of the surface area of the sifting portion.

9. The septum of claim 1, wherein the plurality of sieve openings are configured to allow the litter to pass therethrough while preventing the waste material from passing therethrough.

10. The septum of claim 9, wherein the guide section is a substantially solid surface.

11. The septum of claim 1, wherein the sifting portion is affixed to or integral with the funnel portion.

12. The septum of claim 1, wherein the sifting portion is affixed to or integral with the funnel portion via one or more hinges.

13. The septum of claim 12, wherein the one or more hinges are one or more living hinges.

14. The septum of claim 1, wherein the septum is affixed into an interior of the chamber of the litter device.

15. The septum of claim 14, wherein the sifting portion is angled relative to the funnel portion at one or more hinges and the septum has an overall contour similar to the interior of the chamber.

16. The septum of claim 1, wherein the septum includes a slit configured to impart additional flexibility.

17. The septum of claim 16, wherein the slit is part of the guide section.

18. The septum of claim 16, wherein the slit extends from a rear portion partially toward a front of the guide section.

19. The septum of claim 1, wherein the one or more spacers are formed as one or more ribs, posts, tabs, fins, corrugations, or any combination thereof.

20. The septum of claim 1, wherein the one or more spacers project from the outward facing surface of the lead section in a substantially same direction as a funnel neck of a funnel of the funnel portion in a mold position, an in-use position, or both of the septum.

21. The septum of claim 1, wherein the one or more spacers project away from a litter bed when the septum is installed in the litter device.

22. The septum of claim 1, wherein the septum includes a ramp between the funnel opening and the guide section.

23. The septum of claim 22, wherein the ramp is configured to change the speed of the waste material as it transitions from the sifting portion to the funnel portion.

24. The septum of claim 22, wherein the ramp is formed as part of the funnel portion, has a convex contour, and is located between a hinge of the septum and the funnel opening.

25. A litter device comprising:

a) a chamber configured to retain a litter and allow an animal to enter therein to eliminate a waste;

b) a base which supports the chamber;

c) a septum for sifting and funneling a waste material from the litter comprising:

i) a funnel portion having a tapered shape and a funnel opening, wherein the tapered shape is configured to guide or funnel the waste material toward the funnel opening;

ii) a sifting portion connected to the funnel portion, wherein the sifting portion includes:

a lead section configured to first contact the litter and the waste material, wherein the lead section is about 20% to about 50% of a surface area of the sifting portion, and wherein the lead section is a substantially solid surface;

a sieve section having a plurality of openings configured to separate the waste material from the litter, wherein the sieve section is about 20% to about 50% of the surface area of the sifting portion;

a guide section configured to allow the waste material to transition from the sieve section to the funnel portion, and one or more spacers as part of the lead section which are formed at or adjacent to a leading edge of the lead section, and wherein the one or more spacers project from an outward facing surface of the lead section toward an interior wall of the chamber.

* * * * *